Feb. 20, 1968     I. JEPSON     3,369,388
METHOD AND APPARATUS FOR FORMING METAL
Filed Oct. 21, 1965     5 Sheets-Sheet 1

INVENTOR.
IVAR JEPSON
BY
Mason, Kolehmainen, Rathburn and Wyss
ATTORNEYS

Feb. 20, 1968     I. JEPSON     3,369,388
METHOD AND APPARATUS FOR FORMING METAL
Filed Oct. 21, 1965     5 Sheets-Sheet 3
FIG. 9
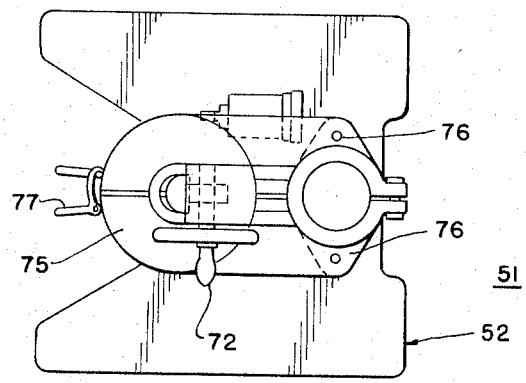
FIG. 8
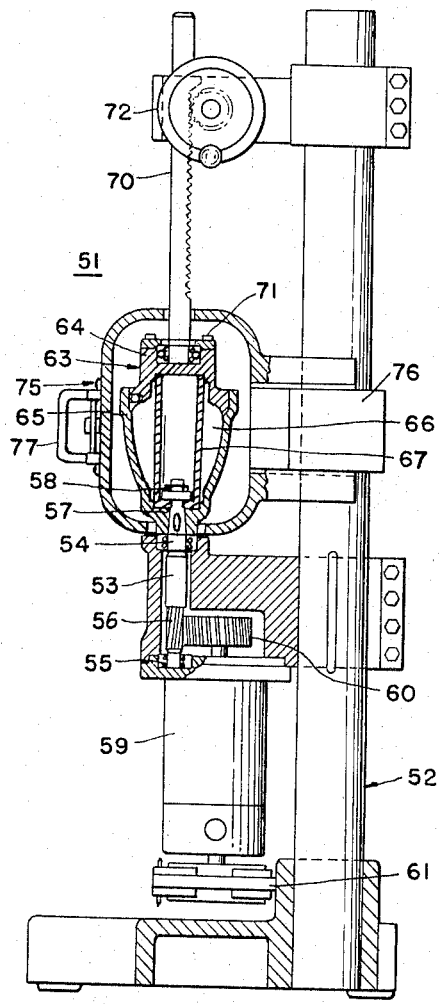
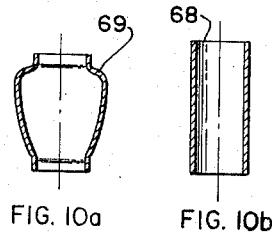
FIG. 10a     FIG. 10b
*INVENTOR.*
IVAR JEPSON
BY *Mason, Kolehmainen, Rathburn and Wyss*
ATTORNEYS Feb. 20, 1968  I. JEPSON  3,369,388
METHOD AND APPARATUS FOR FORMING METAL
Filed Oct. 21, 1965  5 Sheets-Sheet 4

INVENTOR.
IVAR JEPSON
BY
ATTORNEYS

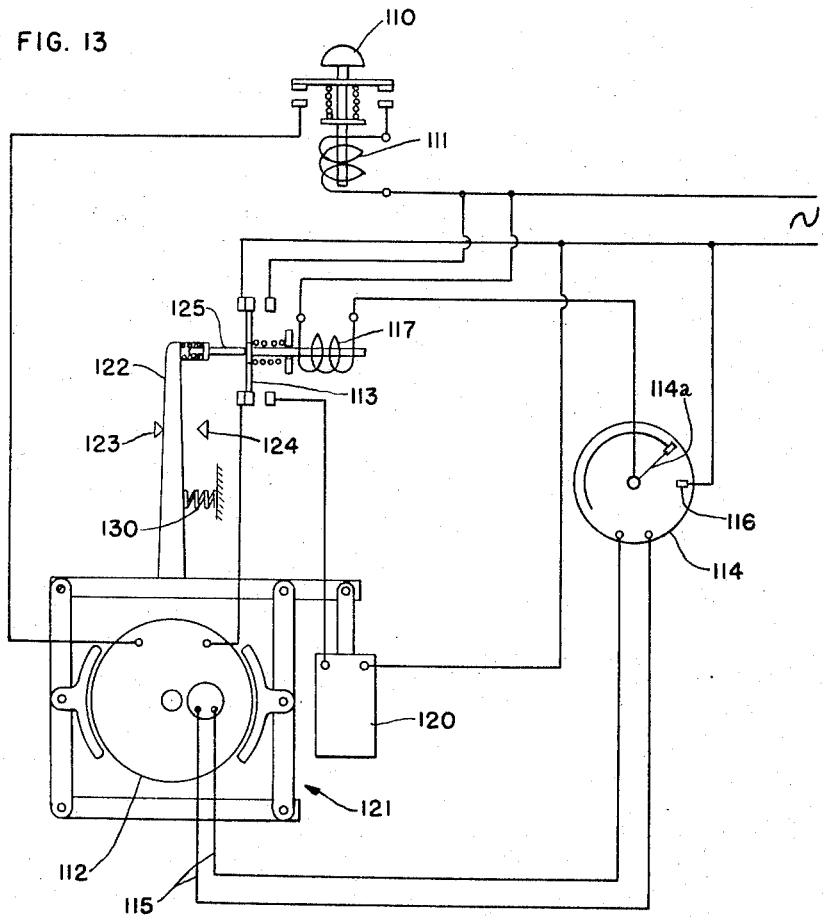

United States Patent Office 3,369,388
Patented Feb. 20, 1968

3,369,388
METHOD AND APPARATUS FOR FORMING METAL
Ivar Jepson, P.O. Box 526, South Duxbury, Mass. 02332
Filed Oct. 21, 1965, Ser. No. 499,213
17 Claims. (Cl. 72—367)

ABSTRACT OF THE DISCLOSURE

An apparatus and method is provided for cold forming of metal parts by centrifugal force. The metal blank to be formed is placed within an enclosed mold cavity and spun on a high speed spindle to produce centrifugal force stresses in the metal blank exceeding the yield point thereof.

This invention relates to a method and apparatus for forming metal and, more particularly, to a method and apparatus wherein variously shaped vessels or parts may be formed by the stresses produced by centrifugal force generated in the walls of the parts as they are rotated at extremely high speeds.

In the past vessels or parts have been formed in many operations by using several different methods such as hydraulic expansion, expansion by rubber plungers, by spinning operations and the like, all requiring expensive tooling and often many operations to obtain the final result. More recently magnetic pulse forming has been used in which extremely high currents are generated in the walls of the parts to be formed. This method requires expensive equipment to start with and specially designed electromagnetic forming units for each different part to be formed aside from the mold or die. Also metals to be successfully formed must have good electric conductivity. Thus, for example, steel or stainless steel with rather poor electric conductiivty cannot directly successfully be formed by this method.

Forming by centrifugal force has been used for molten and very low yield point materials or materials heated to their plastic state in the past. It would be advantageous to apply centrifugal forming to common metals at room temperature from which commercial parts are formed such as copper, brasses, aluminum, steel and stainless steels with yield points in the range from 5,000 to 60,000 pounds per square inch. It has been found that ultra high strength materials presently available having tensile and yield points in the range from 250,000 to 500,000 pounds per square inch are suitable for mold materials. In addition it is also very important that the mold material have a very high fatigue limit. As the equipment is intended to form a large number of parts in the same mold and as the stresses in the mold change from zero to a maximum for each part formed, it is of course important that the fatigue stress limit is high also. Materials with ultra high tensile strength are often brittle with low ductility and, therefore, the fatigue limit sometimes is low for these high strength materials. However, under present research, fatigue limits of metals of over 160,000 pounds per square inch are obtainable and give an ample margin of safety over the stresses required for forming the materials of interest.

The stress S produced by the centrifugal force in a rotating rim may be defined as $$S = mV^2 = \frac{d}{g}V^2$$

where $m$ is the mass density, $V$ is the rim velocity and $d$ is the density. Thus, it is seen the stress in the rim made from a material with a certain density depends only on the peripheral velocity. Thus two rims of the same density rotating with equal peripheral velocities are equally stressed no matter what the diameter or rim thickness may be. Therefore, the stresses in the mold would be the same whether a small diameter or large diameter part is formed.

There are, however, other things to consider in determining the smallest and largest part that can be practically formed by this method. For small parts the revolutions per minute become very high. Thus, for example, if a part one-half inch in diameter is to be formed and if the yield point is such that a peripheral velocity of 550 feet per second is required, the revolutions per minute would have to be 250,000 r.p.m. On the other hand, for very large parts, the energy required to bring the mold up to speed as well as the energy that must be removed to stop the revolving parts becomes very large if starting and stopping time is to be held within a reasonably short duration. Thus if it takes, for example, six seconds for a 16 horsepower motor to accelerate a 2 inch radius mold up to forming speed, it would take 2,666 horsepower to accelerate a 10 inch radius mold. If one allowed one minute for acceleration time, it would take only 267 horsepower. Thus it can be seen that very small parts require a machine design with a very high speed spindle and a very large part requires a machine design with a very high power input.

As previously mentioned, the stresses due to centrifugal force in the mold as in the part to be formed are independent of the wall thickness. By designing the mold with a rather thin wall section, the moment of inertia and thus the power requirement can be reduced. On the other hand, it is desirable to have a certain amount of energy stored in the mold because when the parts suddenly form and fly out against the inner wall of the mold the energy required for this forming is in large degree obtainable from the energy stored in the rotating mold itself.

Moreover, in order to obtain good production rates, it is desirable to provide a split mold with rapid locking and disconnecting means so that the formed part can be quickly removed and the new part inserted.

Accordingly, it is an object of this invention to provide a new and improved method and apparatus for forming metal.

A further object of the present invention is to utilize extremely high strength mold materials so that parts of common material can be formed even when the yield strength of these materials is rather high.

A further object of the present invention is to provide a low cost method and apparatus for forming variously shaped parts.

A further object of this invention is to provide inexpensive forming molds that can be readily mounted and removed from the apparatus so that various parts can be formed just by replacing an inexpensive mold.

A further object of the present invention is to provide rapid locking means for the split sections of a mold so that the mold can be loaded and unloaded without delays.

Yet another object of the present invention is to utilize centrifugal force to automatically lock the mold sections together as the mold rotates.

Further objects and advantages of the invention will become apparent as the following description proceeds and the features of novelty which characterize the invention will be pointed out with particularity in the claims annexed to and forming a part of this specification.

In accordance with the present invention, there is provided a new and improved apparatus for forming metal parts and including a high speed spindle capable of rotating at speeds at least as high as that necessary to produce, by centrifugal forces, stresses in the metal parts to be formed exceeding the yield point of the material. A mold is securely mounted on the spindle and rotated therewith capable of receiving parts to be formed. Driving means are provided for accelerating the spindle and mold up to forming speed.

In accordance with another feature of the present invention, there is provided an improved centrifugally actuated locking means for the mold sections for securely locking the mold sections together during rotation of the mold.

According to yet another feature of the present invention, there is provided an automatically controlled metal forming apparatus including means for energizing an electric drive motor and automatic means for stopping the drive motor once the metal forming apparatus has reached forming speeds.

The present invention is also directed to the method of cold forming metal parts. Such metal parts are of the type having yield points below about 60,000 pounds per square inch. The method includes the steps of placing a tubular or other suitably shaped blank of the material to be formed at a temperature below its plastic state temperature into a mold, closing the mold, angularly accelerating or spinning the mold at a speed high enough to develop centrifugal forces in the blank sufficiently great to produce stresses exceeding the yield point of the material to cause flow of said blank to conform to the contour of the mold cavity. Subsequent stopping of the spinning operation of the mold and opening of the mold will permit removal of the formed parts from within the mold.

For a better understanding of the present invention, reference may be had to the accompanying drawings wherein.

Figure 2:
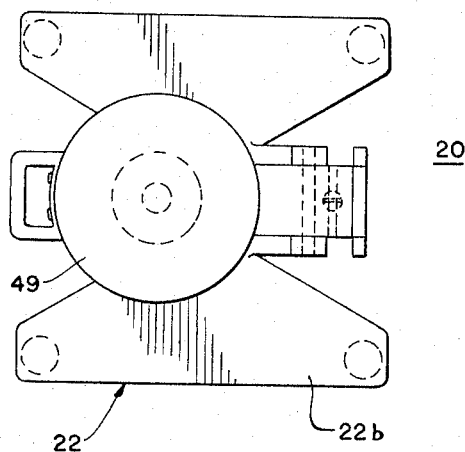
FIG. 2 is a top view of the apparatus of FIG. 1.
Figure 1:
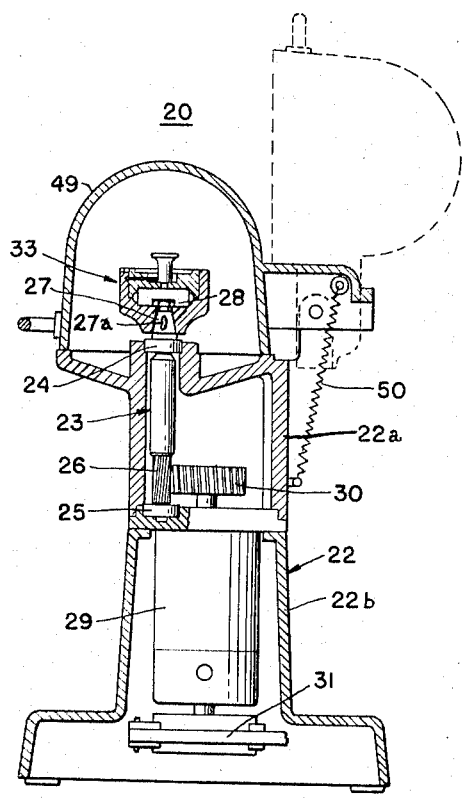
FIG. 1 is an elevational sectional view of the metal forming apparatus according to the present invention.
Figure 5A:
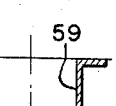
Figure 5B:
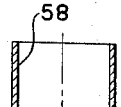
Figure 3A:
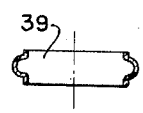
FIGS. 3a and 3b are an example of a typical formed and unformed part.
Figure 3B:
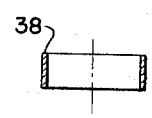
Figure 4A:
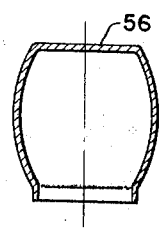
Figure 4B:
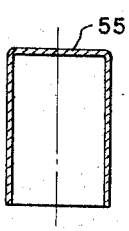
Figure 7:
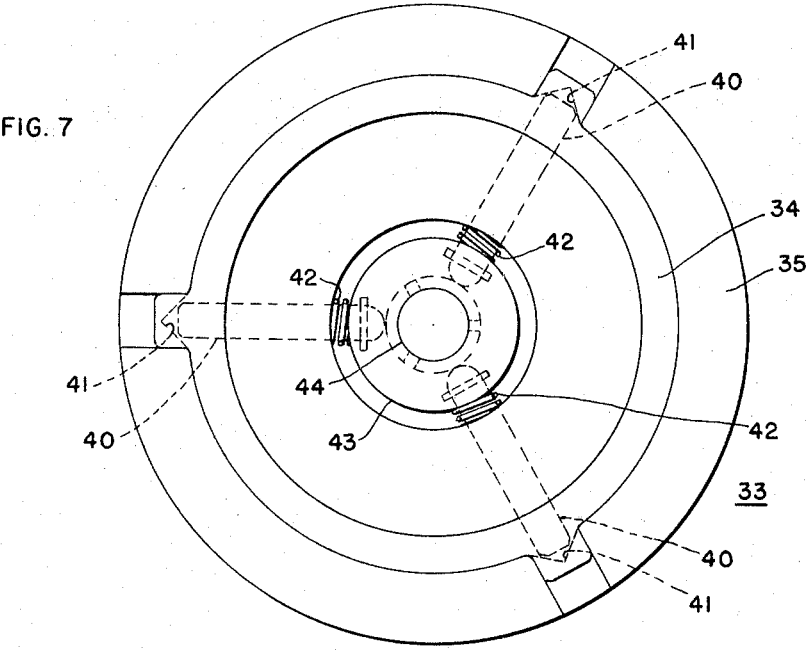
Figure 6:
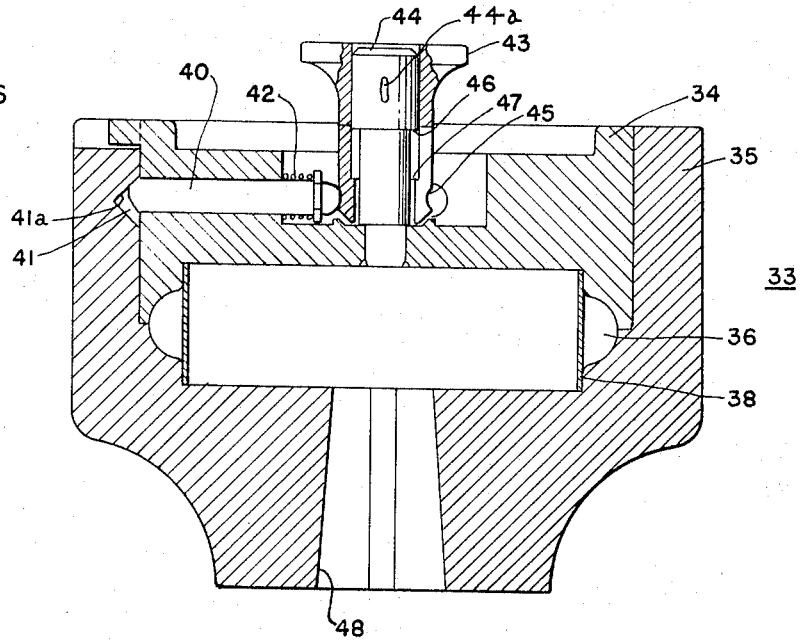
Figure 11:
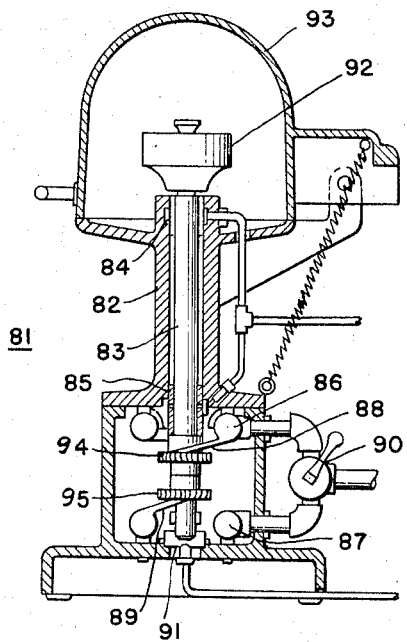
Figure 12:
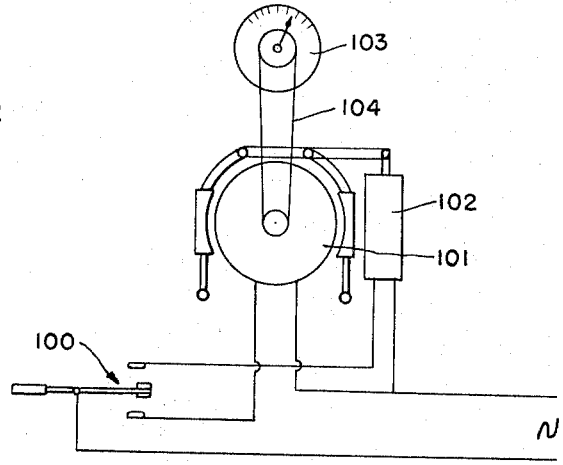

FIGS. 4a and 4b another example of a typical formed and unformed part;

FIGS. 5a and 5b illustrate a tubing part flanged in the metal forming apparatus according to the present invention;

FIG. 6 is a drawing of the mold of the apparatus of FIG. 1, drawn to a larger scale, and used for forming the part of FIG. 3;

FIG. 7 is a top view of the mold of FIG. 6;

FIG. 8 is an elevational cross-sectional view of another embodiment of a metal forming apparatus according to the present invention wherein the upper mold part is too heavy to be removed by hand;

FIG. 9 is a top view of the metal forming apparatus of FIG. 8;

FIGS. 10a and 10b are another example of a formed and unformed part from the machine illustrated in FIGS. 8 and 9;

FIG. 11 is a cross-sectional elevational view of yet another embodiment of a metal forming apparatus according to the present invention and utilizing small turbine discs as the drive means;

FIG. 12 is a schematic wiring diagram for manual operation of an electric motor driven metal forming apparatus according to the present invention; and FIG. 13 is a schematic wiring diagram illustrating an automatic control of a metal forming apparatus according to the present invention.

Referring now to the drawings, and particularly to FIGS. 1, 2, 3a, 3b, 6 and 7, there is illustrated a metal forming machine 20 according to the present invention. The metal forming machine 20 includes a frame 22. The frame 22 mounts a high speed spindle 23 capable of rotating at speeds up to or above that necessary to produce, by centrifugal force, yield point stresses in the metal part to be formed in the apparatus. The spindle 23 rotates between suitable bearings 24 and 25 and is formed with a pinion gear 26 at its lower end and a tapered section 27 at its upper end constructed to receive a key 27a and threaded to receive a nut 28, FIG. 1. An electric motor 29 drives the pinion gear 26 through a suitable gear or gear train 30. A conventional solenoid operated brake 31 is operatively associated with the electric motor 30 to bring the motor and associated rotating parts to a stop after forming of the part is complete.

In order to form the desired part, there is provided a suitable mold 33, best illustrated in FIGS. 6 and 7. The mold 33 is formed of an upper and lower telescoping mold section 34 and 35, respectively, defining a mold cavity 36 of the desired shape. The mold will receive a tubular blank 38, FIGS. 3b and 6, which will subsequently be formed to conform to the shape of the mold cavity as indicated at 39 in FIG. 3a.

To provide for locking together of the upper and lower mold sections 34 and 35, there is provided a plurality of spring biased pins 40 projectable into respective detents 41 and respectively provided with compression springs 42 biasing the respective pins 40 inwardly to withdraw the pins 40 from the detents 41. A hand knob or collet 43 is axially slideable on a stud shaft 44 and is provided with a cam surface 45 effective to engage the inner ends of the pins 40 to project the pins into the detents 41. A key 44a prevents the collet 43 from turning on the shaft 44. The collet 43 may be manually lifted out of engagement with the pins 40 to permit the pins 40 to be retracted under the influence of the respective compression springs 42. Interfering stops 46 and 47 on the stud shaft 44 and the collet 43 respectively prevent accidental removal of the collet 43 from the stud shaft 44. It will be noticed that the pins 40 bear against an outwardly and downwardly sloping surface 41a in the detents 41 defining centralizing and holding means. Advantageously when the mold 33 is rotated at high speed, the pins 40 are biased outwardly under centrifugal loading, and the pins 40 bearing against the downwardly sloping surface 41a tend to wedge the upper mold sections 34 securely against the lower mold section 35.

In order to interconnect the spindle 23 and the mold 33, the mold 33 is provided with a tapered opening 48 receivable on the tapered section 27 and the key 27a serves to interlock the same. The nut 28 prevents separation of the mold 33 from the spindle 23.

Advantageously the frame 22 includes a main casting 22a for mounting the spindle and motor and a base casting 22b for supporting the main casting and the brake 31. A protective or safety cover 49 fits over the mold 33. If desired, the cover 49 may be spring balanced, as by spring 50, to provide ease of opening and closing the cover.

It will be understood that the metal forming machine 20 may be provided with interchangeable molds to provide for the formation of various shaped parts. More specifically, FIG. 4b illustrates a blank 55 in the form of an inverted closed cup, which may be spun to provide the closed vessel 56, FIG. 4a. Fig. 5b illustrates a tubular blank 58 which may be flanged by the metal forming machine of the present invention to provide the formed part 59, FIG. 5a. Thus it is seen that although the metal forming machine 20 lends itself to forming parts from tubings it is not limited to this application and the part 56 is formed as a secondary operation with annealed, previously drawn blank 55.

As a typical example of material which may be formed by the present invention, it has been found that copper, having a yield point between 10,000 to 14,000 pounds per square inch and a weight of 555 pounds per cubic foot requires a peripheral forming velocity of between 289 and 342 feet per second. Accordingly, it can be computed that, for example, a two inch diameter piece will require a speed between 33,100 and 39,200 r.p.m. A 6 inch diameter piece, for example, would require a speed between 11,000 and 13,100 r.p.m. Applying the same analogy to a stainless steel part, it has been found that a stainless steel part having a yield point between 30,000 and 55,000 pounds per square inch and a weight per cubic foot of 483 pounds will require a forming velocity of between 536 and 725 feet per second. Comparing a 2 inch diameter piece, it will require a speed of between 64,300 and 87,600 r.p.m. in order to bring the material to above its yield point. A 6 inch diameter annealed steel tubing would require a speed of between 21,400 and 29,200 r.p.m.

Moreover, other materials having suitable yield points, such as brass and aluminum, may be formed by the metal forming machine according to the present invention.

Referring now to the embodiment of FIGS. 8, 9, 10a and 10b, there is illustrated a vertically mounted machine having provision for handling a comparatively heavy mold. More specifically, referring to FIG. 8, 9, 10a and 10b, there is illustrated a metal forming machine 51 including a frame 52 vertically mounting a spindle 53 between upper and lower bearings 54 and 55. The spindle 53 includes a lower pinion gear 56 and a tapered upper keyed section 57. The tapered section 57 may be threaded at its upper end and a suitable nut 58 will lock a mold 63 to the tapered section 57.

In order to drive the spindle 53, there is provided an electric motor 59 having a suitable gear means 60 operatively engaged with the pinion gear 56 and provided with suitable braking means 61 at its lower end.

As heretofore described, the mold 63 includes an upper and lower mold section 64 and 65, respectively, and a central core section or sleeve 67 to define a mold cavity 66 therebetween. The mold cavity 66 is adapted to receive a blank 68, FIG. 10b, supported on the sleeve 67 and is shaped to form a suitably formed part 69, FIG. 10a.

In order to provide for lifting the upper mold section 64, there is provided a vertical gear rack 70 having its lower end connected through a ball bearing 71 to the upper mold section 34 and provided with a suitable crank and pinion means 72 which may be manually operated to raise the gear rack 70. In like manner as heretofore described, the upper mold section and lower mold section may be provided with suitable centrifugally actuated locking means for securely locking the mold sections together during rotation.

A protective cover 75, horizontally pivotable about hinges 76 and provided with suitable locking means 77, encloses the mold 63.

For forming small diameter parts requiring very high r.p.m., it may be desirable to drive the metal forming machine by a small high speed turbine. Such a metal forming machine 81 is illustrated in FIG. 11. As therein illustrated, there is shown the metal forming machine having a frame 82 mounting a vertical spindle 83 between suitable bearings 84 and 85. A small turbine disc 94 is mounted on the lower end of the spindle. A second turbine disc 95 for reversing the spindle can also be mounted on the lower end of the spindle to bring the spindle to a stop. Compressed air, steam or other suitable means may be used for driving and stopping the spindle. Suitable tubular manifolds 86 and 87 with a plurality of expansion nozzles 88 and 89 drive the respective turbine discs 94 and 95. A two way fluid valve 90 controls the flow of fluid to the respective turbines. Because of the relatively high speed of the spindle 83, the bearings 84 and 85 and in additional thrust bearing 91 are of the fluid types. The spindle carries a mold 92, which may be similar to the mold 33 heretofore described. A protective cover 93 encloses the mold 92.

FIG. 12 shows a simple wiring diagram for manual operation of an electrically controlled metal forming machine according to the present invention. More specifically, a three way switch 100 turns on a motor 101 or brake solenoid 102, respectively. A tachometer 103, driven by a belt 104 or other suitable means, indicates to the operator when to operate the switch 100 to stop the shaft.

FIG. 13 illustrates an automatic control for an electrically driven metal forming machine according to the present invention. A push button 110 energizes a holding relay 111 to turn on a motor 112. The current from the line passes through another normally closed set of contacts in a double pole double throw spring biased relay 113. A contact tachometer 114 is suitably connected to the motor 112 as by lines 115 to indicate the speed of the motor 112. As the motor speeds up, the tachometer indicator 114a makes contact with an adjustable contact 116 that can be set for any desired forming speed. When the desired forming speed has been reached and contact is made through contact 116, a solenoid 117 in the relay 113 is energized opening the motor circuit and closing the second set of contacts energizing a brake solenoid 120 forming a part of a brake assembly 121.

The brake assembly 121 is pivoted on a pivot under the motor shaft and brake drum allowing a small angular movement of a plunger arm 122 between the stops 123 and 124. The plunger arm 122 is fastened to the pivoted brake assembly to move angularly with the brake. The plunger arm 122 has on its outer end a small spring loaded plunger 125 that pushes the relay end of the relay 113 to hold the relay contacts in their energized position and maintain the brake solenoid 120 energized. So long as torque is produced by the rotating parts on the part assembly, the plunger arm 122 will be in its shifted position. However, at the moment the motor stops and the braking torque disappears, a spring 130 will return the plunger arm 122 against the stop 123 and the relay 113 will open the contacts turning off the brake solenoid current and resetting the motor circuit for a repeat cycle of operation. If desired, the contact making tachometer indicator may have its contact points magnetized so that a considerable drop in motor speed can take place before the tachometer points will open. Thus the tachometer indicator circuit will hold the relay 113 energized for a sufficient length of time for the brake assembly arm 122 to take over to hold the relay 113 closed in the solenoid energizing position.

Although the present invention has been described by reference to several embodiments thereof, it will be apparent that numerous other modifications and embodiments may be devised by those skilled in the art and it is intended by the appended claims to cover all modifications and embodiment which will fall within the true spirit and scope of the present invention.

What is claimed as new and desired to be secured by Letters Patent of the United States is:

1. An apparatus for forming metal parts comprising a high speed spindle capable of rotating at speeds at least as high as that necessary to produce by centrifugal forces stresses exceeding the yield point in metal parts to be formed, a mold securely mounted on said spindle and rotated therewith capable of receiving parts to be formed, driving means for accelerating said spindle and mold up to forming speed, and frame means for mounting said spindle and driving means.

2. An apparatus as claimed in claim 1 and additionally including braking means for bringing said spindle and mold to a complete stop.

3. An apparatus for forming metal parts as set forth in claim 2 above wherein said driving means includes a turbine disc and turbine nozzles and wherein said means for bringing said spindle and mold to a complete stop includes a turbine disc and turbine nozzles rotatable in the opposite direction from said first-mentioned turbine disc.

4. An apparatus as set forth in claim 1 above wherein said mold includes an upper and lower mold section, and additionally including lifting means for lifting said upper mold section away from said lower mold section, and including centrifugally actuated locking means in one of said mold sections for securely locking the mold sections together when the mold rotates.

5. An apparatus as set forth in claim 4 above wherein said lifting means comprises a vertical gear rack having its lower end connected to said upper mold section.

6. An apparatus as set forth in claim 1 above wherein said mold includes an upper mold section and a lower mold section separable relative to each other and providing a mold cavity for receiving parts to be centrifugally formed, and centrifugally actuated locking means associated with at least one of said mold sections for securely locking said mold sections together when said mold rotates.

7. An apparatus for forming metal parts comprising a high speed spindle capable of rotating at speeds at least as high as that necessary to produce centrifugal forces exceeding those necessary to generate yield point stresses in metal parts to be formed, a mold mounted on and rotating with said spindle capable of receiving and holding a metal part to be formed by centrifugal force at room temperature, power means for rapidly bringing the spindle speed up to at least said speed at which the centrifugal force produced in the walls of the part to be formed build up stresses in said walls of a magnitude exceeding the yield point of the material to be formed, energy absorbing means for rapidly bringing the spindle to a complete stop, and frame means for mounting said spindle power means and energy absorbing means.

8. A metal forming apparatus as set forth in claim 7 above wherein said mold is formed of high strength materials having yield points and tensile strength in the range of 200,000 to 500,000 pounds per square inch.

9. A machine for forming metal parts comprising in combination a vertically mounted high speed spindle, precision ball bearings mounting said spindle at its upper and lower ends, said spindle being provided with a precision gear pinion at its lower portion and a tapered projection at its upper end adapted for mounting various shaped molds in which the parts to be formed can be inserted, an electric driving motor vertically mounted having a precision gear on its shaft extension engaging said precision gear pinion and provided with a brake drum, braking means acting on said brake drum for rapidly stopping the motor and spindle, a main casting mounting the spindle and motor, and a casting supporting the main casting and braking means.

10. An apparatus as set forth in claim 9 above and additionally including a removable safety cover surrounding the rotatable mold.

11. A forming mold to be used in a centrifugal metal forming apparatus and including upper and lower separable mold sections defining a mold cavity contoured to the shape of the parts to be formed, and having centrifugal locking means for holding the mold sections together when the mold is rotated.

12. A forming mold as set forth in claim 11 above and additionally including manually operable collet means for locking and unlocking said centrifugal locking means when said mold is not rotating.

13. An apparatus for forming metal parts comprising a high speed spindle capable of rotating at speeds at least as high as that necessary to produce centrifugal forces capable of generating stresses exceeding the yield point of the material to be formed, a mold securely mounted on said spindle and rotated therewith capable of receiving parts to be formed in said mold, electric motor driving means for accelerating said spindle and mold up to forming speed, means for automatically determining a preselected forming speed, brake means operatively associated with said electric motor for rapidly stopping said motor and spindle, electric circuit means for applying electrical energy to said electric motor driving means to accelerate said electric motor driving means, and means controlled by said preselected means for disconnecting said circuit means from said electric motor driving means and for automatically applying the braking means when said spindle has reached said preselected speed.

14. An automatically controlled metal forming apparatus comprising a high speed spindle capable of rotating at speeds at least as high as that necessary to produce by centrifugal forces stresses exceeding the yield point of the material in metal parts to be formed, a mold securely mounted on said spindle and rotated therewith capable of receiving parts to be formed in said mold, electric motor means for accelerating said spindle and mold up to forming speed, frame means for mounting said spindle and driving means, a pivoted brake assembly having a spring loaded plunger arm, torque produced by said brake during stopping being effective to pivot said arm against the bias of said spring, an electric solenoid for applying said brake, a holding relay for energizing said electric motor, a double pole double throw relay having a normally open and a normally closed set of contacts, said normally closed contacts being serially connected with said holding relay and said normally opened contacts being connected to energize said brake solenoid, a contact making type tachometer having an adjustable speed contact, said tachometer being connected to energize the last-mentioned relay, said plunger arm being connected to hold said relay in its energized position so long as stopping torque is produced by said brake assembly.

15. A method for cold forming metal parts comprising enclosing a metal part blank at a temperature below the plastic temperature thereof in a mold cavity contoured to the shape of the parts to be formed, angularly accelerating said mold at a speed high enough to develop by centrifugal forces stresses in the blank greater than the yield point of the cold material to cause flow of said blank to conform to the contour of said cavity, and stopping said mold.

16. A method for cold forming metal parts comprising the steps of placing a metal part blank of material at room temperature into an open mold, closing the mold, spinning the mold at a speed high enough to develop by centrifugal forces stresses in the blank greater than the yield point of the cold material, stopping the spinning operation of the mold, opening the mold, and removing the formed part from the mold.

17. An apparatus for forming metal parts comprising a high speed spindle capable of rotating at speeds at least as high as that necessary to produce by centrifugal forces stresses exceeding the yield point in metal parts to be formed, a mold securely mounted on said spindle and rotated therewith and having an enclosed internal mold cavity capable of receiving parts to be formed, driving means for accelerating said spindle and mold up to forming speed, and frame means for mounting said spindle and driving means.

References Cited
UNITED STATES PATENTS

| | | | |
|---|---|---|---|
| 2,167,539 | 7/1939 | Vienneau | 72—483 |
| 2,454,116 | 11/1948 | Ames et al. | 18—19 |

RICHARD J. HERBST, *Primary Examiner.*

L. A. LARSON, *Assistant Examiner.*